United States Patent [19]

Yagi

[11] Patent Number: 4,780,623

[45] Date of Patent: Oct. 25, 1988

[54] CONTOUR COMPENSATING CIRCUIT

[75] Inventor: Yasuo Yagi, Tokyo, Japan

[73] Assignee: Pioneer Electronic Corporation, Tokyo, Japan

[21] Appl. No.: 153,682

[22] Filed: Feb. 8, 1988

[30] Foreign Application Priority Data

Feb. 6, 1987 [JP] Japan .............................. 62-17029[U]

[51] Int. Cl.$^4$ ....................... H03K 5/01; H03K 5/153; H03B 1/00
[52] U.S. Cl. .................................... 307/268; 307/351; 307/358; 328/162; 328/163; 328/164; 328/165
[58] Field of Search ....................... 307/351, 268, 358; 328/162, 163, 164, 165

[56] References Cited

FOREIGN PATENT DOCUMENTS 58-136175  8/1983  Japan .
58-136176  8/1983  Japan .
58-136177  8/1983  Japan .
58-169770  11/1983  Japan .
60-193752  12/1985  Japan .
61-111260  7/1986  Japan .

Primary Examiner—John S. Heyman
Assistant Examiner—Trong Quang Phan
Attorney, Agent, or Firm—Sughrue, Mion, Zinn, Macpeak, and Seas

[57] ABSTRACT

A contour compensating circuit is disclosed for compensating a video signal in such a manner as to obtain contour portions which are not overly stressed. The compensating operation of the contour compensating circuit according to this invention is performed by obtaining a full-wave rectified signal of the primary differentiated signal of a video signal and the positive- and negative-phase signals of a secondary differentiated signal thereof and forming a secondary pseudo-differentiated signal with a narrow pre and post overshooting width range from the signals obtained by selecting a first higher level signal between the full-wave rectified signal and one of the positive-phase signal and the half-wave signal thereof identical in porality with the full-wave signal, selecting a second higher level signal between the full-wave rectified signal and one of the negative-phase signal and the half-wave signal thereof identical in porality with the full-wave signal and comparing the first and second higher level signals, half-wave signal and the full-wave rectified signal. The resulting signal is superposed on the video signal.

4 Claims, 6 Drawing Sheets

FIG. 1A
PRIOR ART
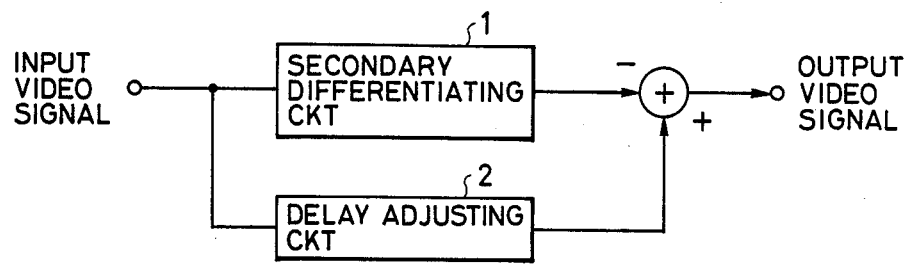
FIG. 1B
PRIOR ART
INPUT VIDEO SIGNAL
SECONDARY DIFFERENTIATED SIGNAL
OUTPUT VIDEO SIGNAL

INPUT SIGNAL

OUTPUT SIGNAL

CONTOUR COMPENSATING CIRCUIT

BACKGROUND OF THE INVENTION

The present invention relates to a contour compensating circuit for compensating for the contour of a two-dimensional image formed by a video signal.

There is known a contour compensating circuit as shown in FIG. 1A for clarifying the contour of a two-dimensional image displayed through the process of reproducing a video signal. The contour compensating circuit includes a secondary differentiating circuit 1 for obtaining a secondary differentiated signal from the video signal, a delay adjusting circuit 2 for relatively compensating for the delay of the secondary differentiated signal by delaying the video signal, and a subtraction circuit 3 for synthesizing the outputs of these circuits.

Referring to FIG. 1A, the operational principle of such a circuit will be described. A primary differentiated signal is obtained by differentiating a input video signal having a waveform as shown in FIG. 1B. The primary differentiated signal is further differentiated to obtain a secondary differentiated signal. The secondary differentiated signal is superposed on the input video signal to cause pre and post overshooting in the contour portion of the video signal so as to obtain an output video signal whose level difference and signal level changes are boosted. When the output video signal is reproduced by a display device (not shown), the contour portion of the image is stressed.

The contour portions of the displayed image formed are thus stressed. However, the stronger the contour is stressed, the larger they are of the stressed contour portion becomes. There is thus a drawback in that the contour of the image may be stressed excessively.

SUMMARY OF THE INVENTION

It is therefore an object of the present invention to provide a contour compensating circuit capable of preventing the contour portion of an image from being excessively stressed.

In order to accomplish the aforementioned object, the contour compensating circuit according to the present invention is designed to obtain a full-wave rectified signal of the primary differentiated signal of a video signal and the positive- and negative-phase signals of a secondary differentiated signal thereof and form a secondary pseudo-differentiated signal with a narrow pre and post overshooting width range from the signals obtained by selecting the signal having a higher level between the full-wave rectified signal of a primary differentiated signal and the positive-phase signal or the half-wave signal thereof having the same porality as the full-wave rectified signal and by selecting the signal having a higher level between the full-wave rectified signal and the negative-phase signal or the half-wave signal thereof having the same porality as the full-wave rectified signal, whereby the result obtained is superposed on the video signal.

BRIEF DESCRIPTION OF THE DRAWINGS

FIGS. 1A and 1B are a block circuit diagram of a conventional compensating circuit and a waveform chart showing waveforms at the respective points therein;

DETAILED DESCRIPTION OF THE PREFERRED EMBODIMENTS

Figure 2:
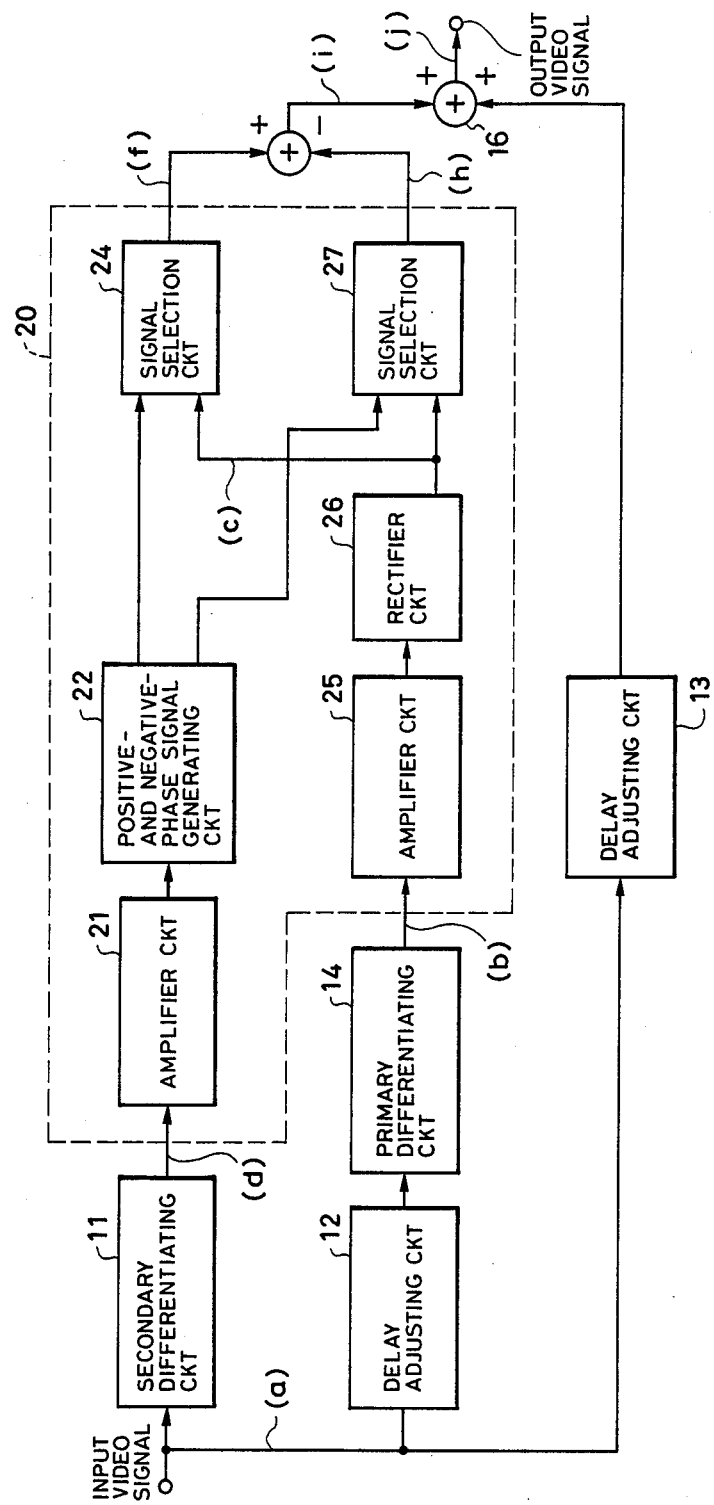
FIG. 2 is a block circuit diagram of a preferred embodiment of a contour compensating circuit of the present invention.

Referring now to the block circuit diagram shown in FIG. 2 and the waveform charts (a) to (i) of FIG. 3, wherein the reference characters correspond to exemplified respective signals indicated in FIG. 2, embodiment of the present invention will be described.

Figure 3:
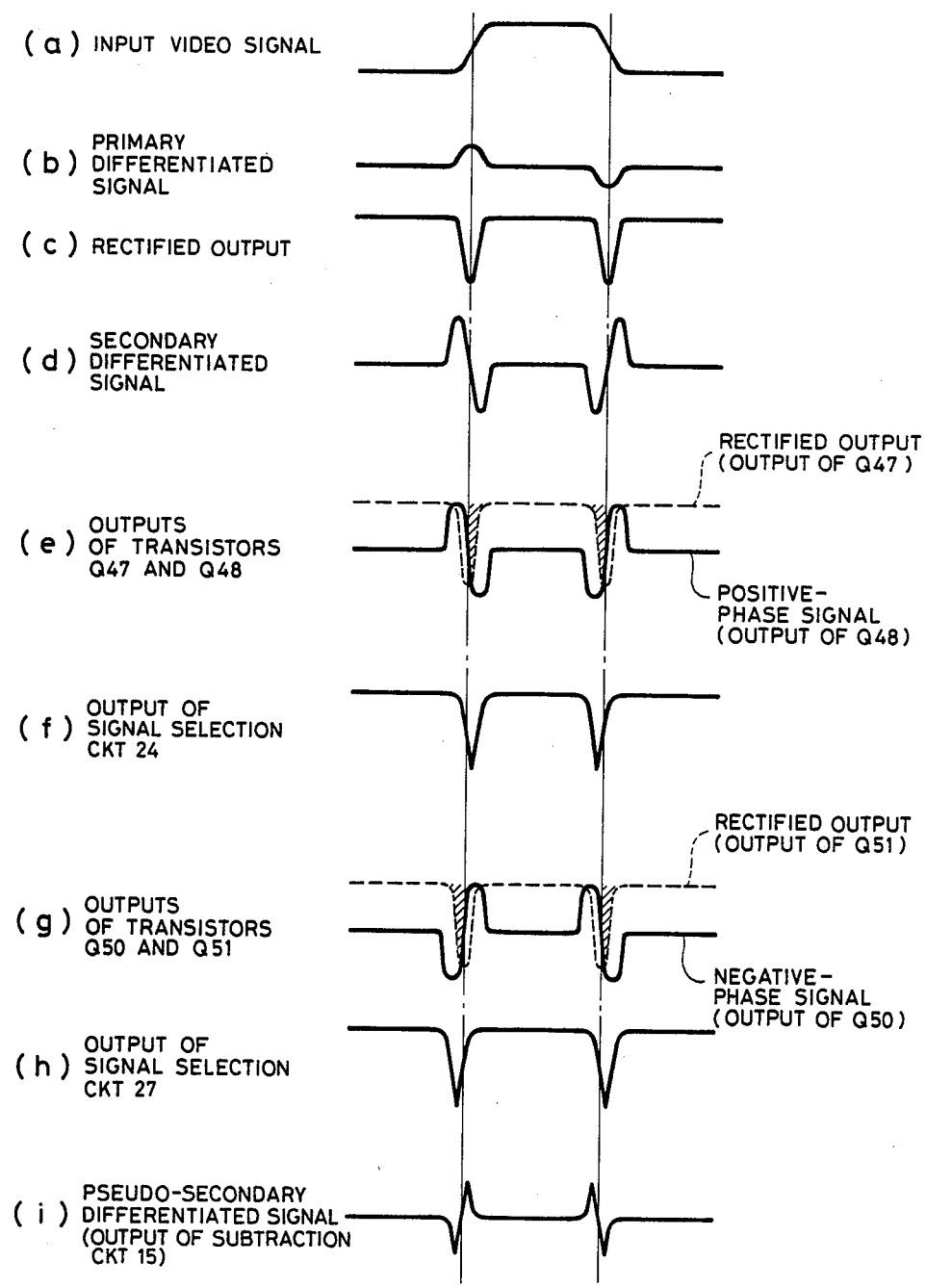
FIGS. 3 and 4 are waveform charts showing signal waveforms at respective points in the circuit shown in FIG. 2.
Figure 4:
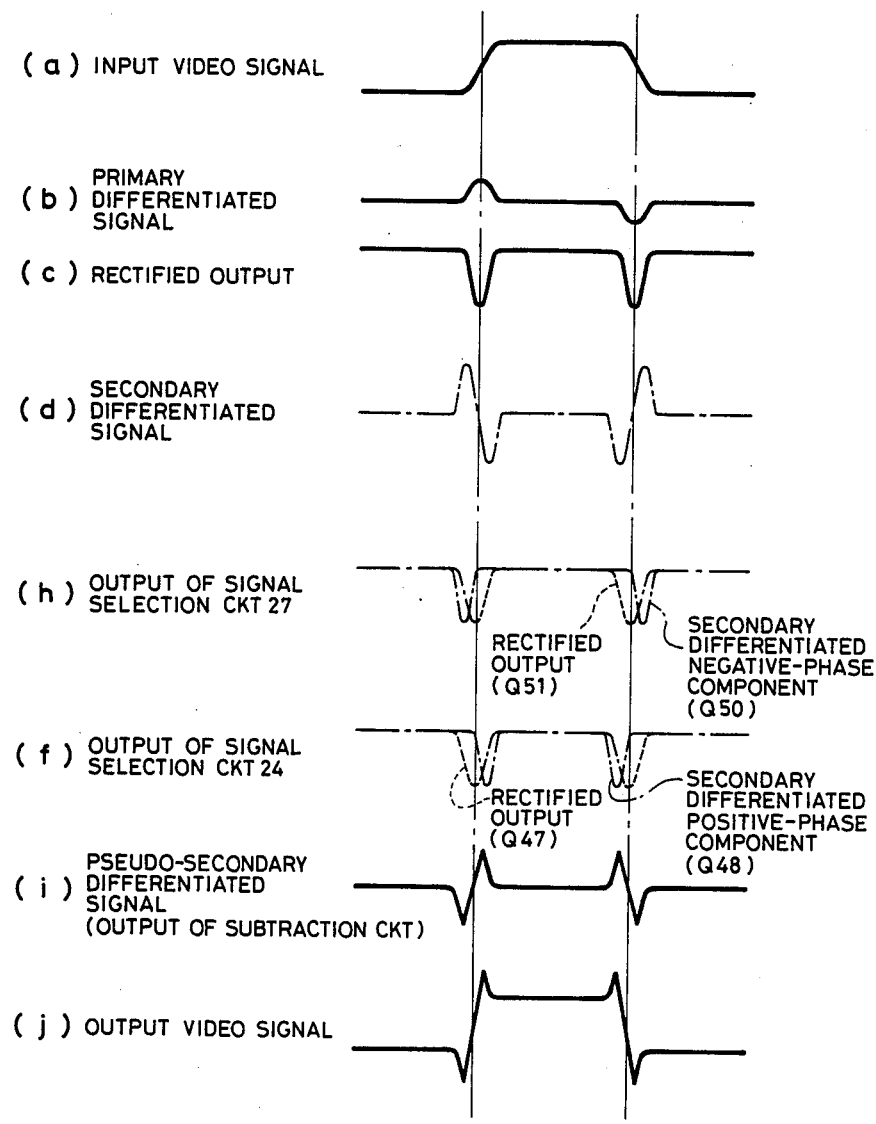
Figure 5A:
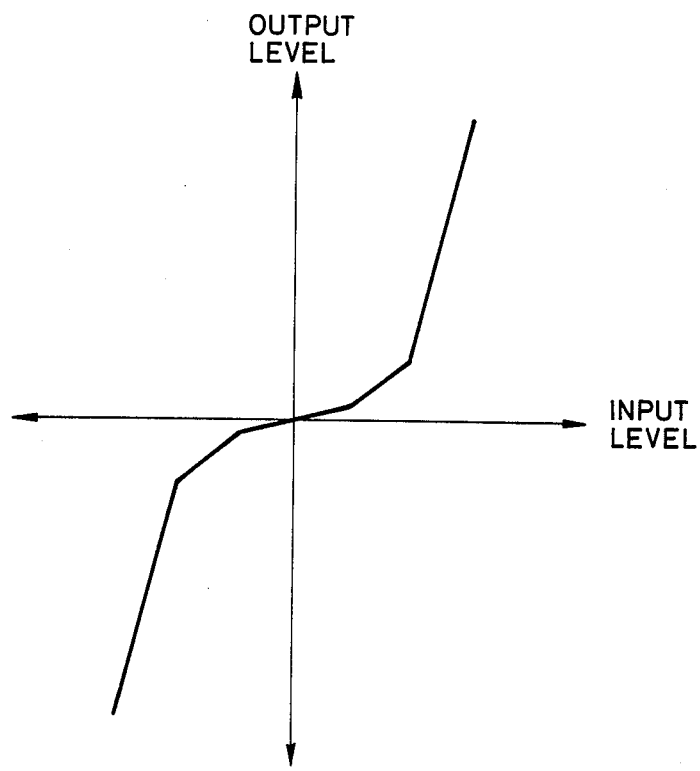
FIGS. 5A and 5B are diagrams illustrating the amplification characteristics of an amplifier circuit.
Figure 5B:
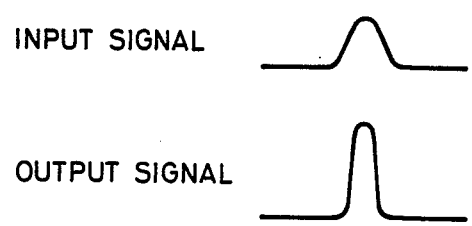

In FIG. 2, an input video signal is supplied to a secondary differentiating circuit 11 and delay adjusting circuits 12, 13. The second differentiated component of the video signal obtained by the secondary differentiating circuit 11 is supplied as a secondary differentiated signal to the amplifier circuit 21 of a signal processing circuit 20 and amplified to a suitable level. The output of the amplifier circuit 21 is supplied to a positive- and negative-phase signal generating circuit 22. The positive- and negative-phase signal generating circuit 22 generates mutually inverted positive- and negative-phase signals from the secondary differentiated signal and supplies those signals to the respective input terminals of signal selection circuits 24, 27. The amplifier circuit 21 and the positive- and negative-phase signal generating circuit 22 is composed of, e.g., a differential amplifier circuit. The positive- and negative-phase signals may be half-wave rectified signals of positive- and negative-phase signals identical in polarity with the full-wave rectified output of the primary differentiated signal (as will described in more detail below). FIG. 4 shows the respective signal waveforms (h), (f) for that case. The half-wave signal is obtainable by converting the output of the differential amplifier circuit into a half-wave output or by causing the transistor of the following stage signal selection circuit to operate in the so-called B-class mode.

The video signal so delayed and adjusted as to properly set the mutual delay time of the primary and secondary differentiated signal components is primarily differentiated in a primary differentiating circuit 14, and the primary differentiated signal is amplified to reduce the width of its waveform by an amplifier circuit 25. The amplifier circuit 25 is composed of a circuit whose amplification factor increases in proportion to the level of the input signal. The reason for the use of the amplifier circuit is to narrow the waveform width of the pre and post overshooting of a pseudo-secondary differentiated signal (as described below in more detail). However, the same effect can be obtained from an amplifier circuit having ordinary characteristics. The output of the amplifier circuit 25 is full-wave rectified by a rectifier circuit 26 before being supplied to each of the other input terminals of signal selection circuits 24, 27. Each of the signal selection circuits 24, 27 selects as its output the signal whose level is the higher. The circuits 21 to 27, respectively coupled to the input terminals of the subtraction circuit 15 (FIGS. 3, (e) to (h), FIGS. 4, (h) to (f)), constitute a signal processing circuit 20. The subtraction circuit 15 is composed of, e.g., a differential amplifier circuit. The subtraction circuit 15 produces a pseudo-secondary differentiated signal from the level difference between the respective signls. The pseudo-secondary differentiated signal thus obtained is, as shown in FIG. 3, at (i) and FIG. 4, at (i), reduced to pre and post overshooting with a narrow waveform width.

The pseudo-secondary differentiated signal is set at a suitable level and supplied to one of the input terminals of an adder circuit 16. A video signal whose signal delay time has properly been regulated to combine with the pseudo-secondary differentiated signal is applied from the delay circuit 13 to the other input terminal of the adder circuit 16, and the pseudo-secondary differentiated signal is superposed by the adder circuit 16 on the video signal, whereby an output video signal with its contour is compensated as shown in FIG. 4, at (i) is obtained.

Figure 6:
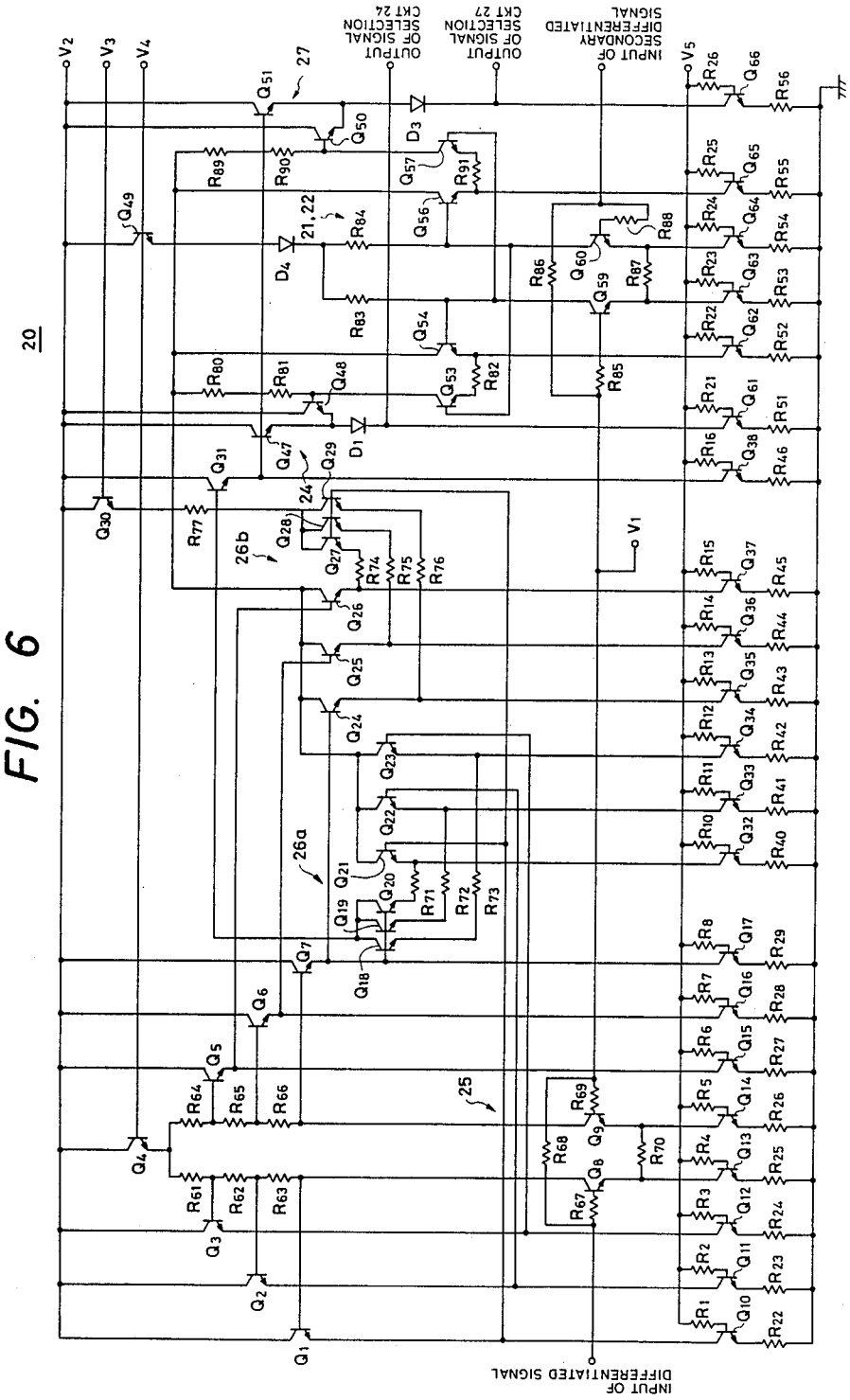
FIG. 6 is a circuit diagram showing a specific example of a signal processing circuit.

Referring to FIG. 6, a specific example of the signal processing circuit 20 will be described. In FIG. 6, circuit voltages $V_1$ to $V_5$ are set at proper levels for operation of the circuit.

The primary differentiated signal is applied to a differential amplifier circuit 25 formed with transistors $Q_8$, $Q_9$, etc. A divider circuit is formed of resistors $R_{61}$ to $R_{63}$ and $R_{64}$ to $R_{66}$ respectively connected to the collectors of the transistors $Q_8$ and $Q_9$. The divided voltage outputs produced by the resistors by the collector current proportional to the primary differentiated signal are supplied to the bases of the transistors $Q_1$ to $Q_3$ and $Q_5$ to $Q_7$, respectively. The transistors $Q_1$ to $Q_3$ and $Q_5$ to $Q_7$ sequentially operate according to a level increase of the collector current.

The emitter outputs of the transistors $Q_1$ to $Q_3$ are connected to a differential amplifier circuit 26a formed with transistors $Q_{18}$ to $Q_{23}$, whereas the emitter outputs of the transistors $Q_5$ to $Q_7$ are supplied to a differential amplifier circuit 26b formed by transistors $Q_{24}$ to $Q_{29}$. As the differential amplifier circuits 26a, 26b amplify the waveform of only the positive or negative side of each input signal, the synthesized output of the two amplifier circuits 26a, 26b becomes the full-wave rectified waveform of an input signal, as illustrated in FIG. 3 at (c) and FIG. 4 at (c). The output thus synthesized is supplied via a transistor $Q_{31}$ to a signal selection circuit 24 formed by transistors $Q_{47}$, $Q_{48}$ and another signal selection circuit 27 formed by transistors $Q_{50}$, $Q_{51}$. The emitters of the two transistors constituting each signal selection circuit are connected to each other, and the one whose emitter output is at the higher level bears the circuit output.

Due to the presence of a differential amplifier circuit formed by transistors $Q_{59}$, $Q_{60}$ and a following stage differential amplifier circuit formed by transistors $Q_{53}$, $Q_{54}$, transistors $Q_{56}$, $Q_{57}$, etc., a positive-phase signal in phase with the secondary differentiated signal and a negative-phase signal out of phase therewith are obtained at the collector output of the transistor $Q_{53}$ and the collector output of the transistor $Q_{57}$, respectively. These signals are supplied to the bases of the transistor $Q_{48}$ and the transistor $Q_{50}$ of the signal selection circuit 24. The signal selection circuit 24 outputs, as shown in FIG. 3 at (e) and (f), the signal having the higher level between the rectified output and the positive-phase component of the secondary differentiated signal, whereas the signal selection circuit 27 outputs, as shown in FIG. 3 at (g) and (h), the signal having the higher level between the rectified output and the negative-phase component thereof. The selected output of each signal selection circuit is supplied to the subtraction circuit 15, to thus make available the pseudo-secondary differentiated signal. In this case, the class-B operation of the transistors $Q_{48}$, $Q_{50}$ allows the generation of the signal selection circuit outputs as shown in FIG. 3 at (h) and (f).

The width of the pre and post overshooting is thus narrowed and the signal levels are properly regulated, and hence the contours of the reproduced image are made finer with a suitable contrast, whereby the picture quality is significantly improved. Moreover, the secondary differentiated signal component supplied to the signal selection circuit is made pulse-like by means of saturated amplification in such a manner as to suppress its pulse changes. Also, by amplifying the primary differentiated signal component using an amplifier whose output amplification factor increases with the input level as described above, any noise component whose level is relatively low and suppressible is reduced, making it possible to decrease the generation of dot noise, which can arise due to contour compensation.

As is believed evident from the foregoing description, it is possible to determine the position into which the delay adjusting circuit 12 is inserted.

The amplifier circuit 25 is not limited to the specific arrangement referred to in this embodiment and can be replaced with another circuit having a like function, e.g., a waveform rectifying circuit or the like.

As set forth above, the contour compensating circuit according to the present invention is designed to obtain the full-wave rectified signal of the primary differentiated signal of a video signal, to obtain the pseudo-secondary differentiated signal having a narrow pulse width, the pseudo-secondary differentiated signal being obtained from the signal obtained by selecting the aforesaid positive-phase signal or the signal having the higher level between its half-wave signal and the full-wave rectified signal and the signal obtained by selecting the aforementioned negative-phase signal or the signal having the higher level between its half-wave signal and the full-wave rectified signal, and to superpose the signals thus obtained on the video signal. Accordingly, the width of the pre and post overshooting of the video signal whose contour has thus been compensated as narrowed so that the contrast of the contour portion is prevented from being excessively stressed.

What is claimed is:

1. A contour compensating circuit comprising:
   a primary differentiating circuit for obtaining a primary differential signal as a primary differential component of a video signal;
   full-wave rectifying means for obtaining a rectified voltage signal resulting from the full-wave rectification of said primary differential signal;
   a secondary differentiating circuit for obtaining a secondary differential signal as a secondary differential component of said video signal;
   positive- and negative-phase signal generating means for obtaining at least one group of the groups consisting of positive- and negative-phase voltage signals of said secondary differential signal and half-wave signals of said positive- and negative-phase voltage signals, said half-wave signals being identical in porality with said rectified voltage signal;
   first signal selection means for selecting a first higher level signal between said rectified voltage signal and one of said positive-phase voltage signal and said half-wave rectified signal thereof;

second signal selection means for selecting a second higher level signal between said rectified voltage signal and one of said negative-phase voltage signal and said half-wave rectified signal thereof;

a subtraction circuit for obtaining a signal representing a level difference between the output signals of said first and second signal selection means; and means for superposing said signal representing said level difference on said video signal.

2. The contour compensating circuit of claim 1, further comprising class-B amplifier means for providing said half-wave rectified signal of said positive-phase voltage signal and said half-wave rectified signal of said negative-phase voltage signal.

3. The contour compensating circuit of claim 2, further comprising means for adjusting a relative delay between said signal representing said level difference and said video signal.

4. The contour compensating circuit of claim 1, wherein said subtracting circuit comprises a differential amplifier circuit.

* * * * *